United States Patent [19]

Norton

[11] Patent Number: 5,699,825
[45] Date of Patent: Dec. 23, 1997

[54] DOUBLE SEAT FLOW CONTROL VALVE

[75] Inventor: Larry A. Norton, Elkhorn, Wis.

[73] Assignee: United Dominion Industries, Inc., Charlotte, N.C.

[21] Appl. No.: 557,453

[22] Filed: Nov. 14, 1995

[51] Int. Cl.$^6$ ............................. B08B 9/06; F16K 31/222
[52] U.S. Cl. .................. 137/238; 137/312; 137/614.17; 137/614.18; 134/166 C; 251/63.5; 251/63.6
[58] Field of Search ...................... 137/240, 312, 137/614.17, 614.18, 614.19, 238, 554, 556; 251/63.4, 63.5, 63.6; 134/166 C

[56] References Cited

U.S. PATENT DOCUMENTS

| | | | |
|---|---|---|---|
| 4,304,251 | 12/1981 | Schädel et al. | 137/312 |
| 4,360,039 | 11/1982 | Jeppsson | 137/614.17 |
| 4,368,753 | 1/1983 | Bräkelmann et al. | 137/240 |
| 4,373,545 | 2/1983 | Knappe | 137/240 |
| 4,460,014 | 7/1984 | Mases et al. | 137/312 |
| 4,461,318 | 7/1984 | Bräkelmann et al. | 137/240 |
| 4,483,360 | 11/1984 | Knappe et al. | 137/240 |
| 4,605,035 | 8/1986 | Rasmassen et al. | 137/312 |
| 4,655,253 | 4/1987 | Ourensma | 137/312 |
| 4,687,015 | 8/1987 | Mieth | 137/240 |
| 4,757,834 | 7/1988 | Mieth | 137/614.17 |

FOREIGN PATENT DOCUMENTS

| | | | |
|---|---|---|---|
| 25 23 202 B2 | 4/1979 | Germany | F16K 35/02 |
| 35 15 761 C2 | 7/1987 | Germany | F16K 31/12 |
| 2 076 116 A | 11/1981 | United Kingdom | F16K 11/04 |
| 0 140 510 A1 | 5/1985 | WIPO | F16K 1/38 |

OTHER PUBLICATIONS

"Air–Actuated and Manual Compression Valves," 2–p. brochure TR–1101 8/83–3N, Tri–Canada, Inc., Mississauga, Ontario, Canada, believed to have been published on or around Aug. 1993 ( see 8/83 reference on face of brochure).

"Automatic Valves and Manifolds by Cherry–Burrell," Brochure #SB–1829, TA–10M–979P, Cherry–Burrell, Cedar Rapids, IA, undated, and no date is available. However, this is believed to be prior art with respect to the present invention.

*Primary Examiner*—George L. Walton
*Attorney, Agent, or Firm*—Fitch, Even, Tabin & Flannery

[57] ABSTRACT

A double seat flow control valve includes three pneumatic pistons enclosed within two air chambers to operate upper and lower valve disks for venting operations in addition to valve opening and valve closing operations. An air boost is provided for the upper valve disk to maintain the upper valve disk in a closed position during venting of the lower valve disk.

8 Claims, 10 Drawing Sheets

DOUBLE SEAT FLOW CONTROL VALVE

BACKGROUND OF THE INVENTION

1. Field of the Invention

The present invention pertains to flow control valves of the type having a double seat, and in particular to such valves having a vent feature useful for so-called clean-in-place applications.

2. Description of the Related Art

Over the years, a class of valves, typically referred to as "double block and bleed" or "double block and vent" valves have been employed in industrial applications to isolate incompatible fluids in processing systems. Typically, these valves are relied upon to provide a positive closure of each individual flow path through the valve assembly. Valves of this general type are disclosed, for example, in the following U.S. Pat. Nos. 4,461,318; 4,368,753; 4,304,251; 4,687,015; 4,436,106; 4,552,167; and 4,254,792. Additional examples are found in the following foreign patent documents: EP 0,140,510, German Patentschrift 3,515,761; German Auschlegeschrift 2,523,202; and United Kingdom Application 2,076,116.

The present invention is particularly concerned with double seat valves having leakage control, and in which two valve disks are independently displaceable so as to allow selective cleaning at various passageways through the valve. One example of this particular type of arrangement is shown in U.S. Pat. No. 4,461,318, mentioned above.

Despite the advances provided over the years, improvements are still being sought, particularly improvements which relate to automatic so-called "clean-in-place" operations.

SUMMARY OF THE INVENTION

It is an object of the present invention to provide a double seat valve having double block and vent features.

Mother object of the present invention is to provide a valve of the above-described type which can be operated for automatic cleaning operations, without requiring dismantling of the valve or rerouting associated piping work.

A further object of the present invention is to provide automatic "clean-in-place" operation in which the valve seats may be operated independently for independent cleaning.

A related object of the present invention is to provide valves of this type having improved assurance that isolation in different flow paths through the valve will be maintained.

These and other objects of the present invention which will become apparent from studying the appended description and drawings are provided in a valve unit, comprising:

- a body including first and second valve seats and defining first and second product flow paths, a leakage flow path, and a connecting passageway between said first and said second product flow paths;
- first and second valve disks movable between respective open and closed positions, said first and said second valve disks cooperating with said first and said second valve seats to permit and to block flows between said first and said second product flow paths and said connecting passageway, respectively;
- actuator means including pressure chamber means with at least one pressure chamber for containing a pressurized fluid, and a plurality of fluidically operated pistons of at least two different sizes within the pressure chamber means and coupled to said first and said second valve disks to independently move said first and said second valve disks between said open and said closed positions.

DETAILED DESCRIPTION OF THE PREFERRED EMBODIMENT

Referring now to the drawings, a valve unit is generally indicated at 10. The valve unit is of the double block and vent type, and is suitable for use with automatic "clean-in-place" systems. As will be seen herein, two valve disks are included, each operable independently of the other, a feature useful for cleaning operations, for example. Alternatively, both valve disks may be operable concurrently so as to open or close communication of the two flow paths to the valve unit. Accordingly, the valve unit has four operating positions: a valve open position in which flow communicates between the two product flow paths through the valve unit, a valve closed position in which the two product flow paths are isolated from one another, a position for venting the upper valve disk, and a position for venting the lower valve disk.

Figure 1:
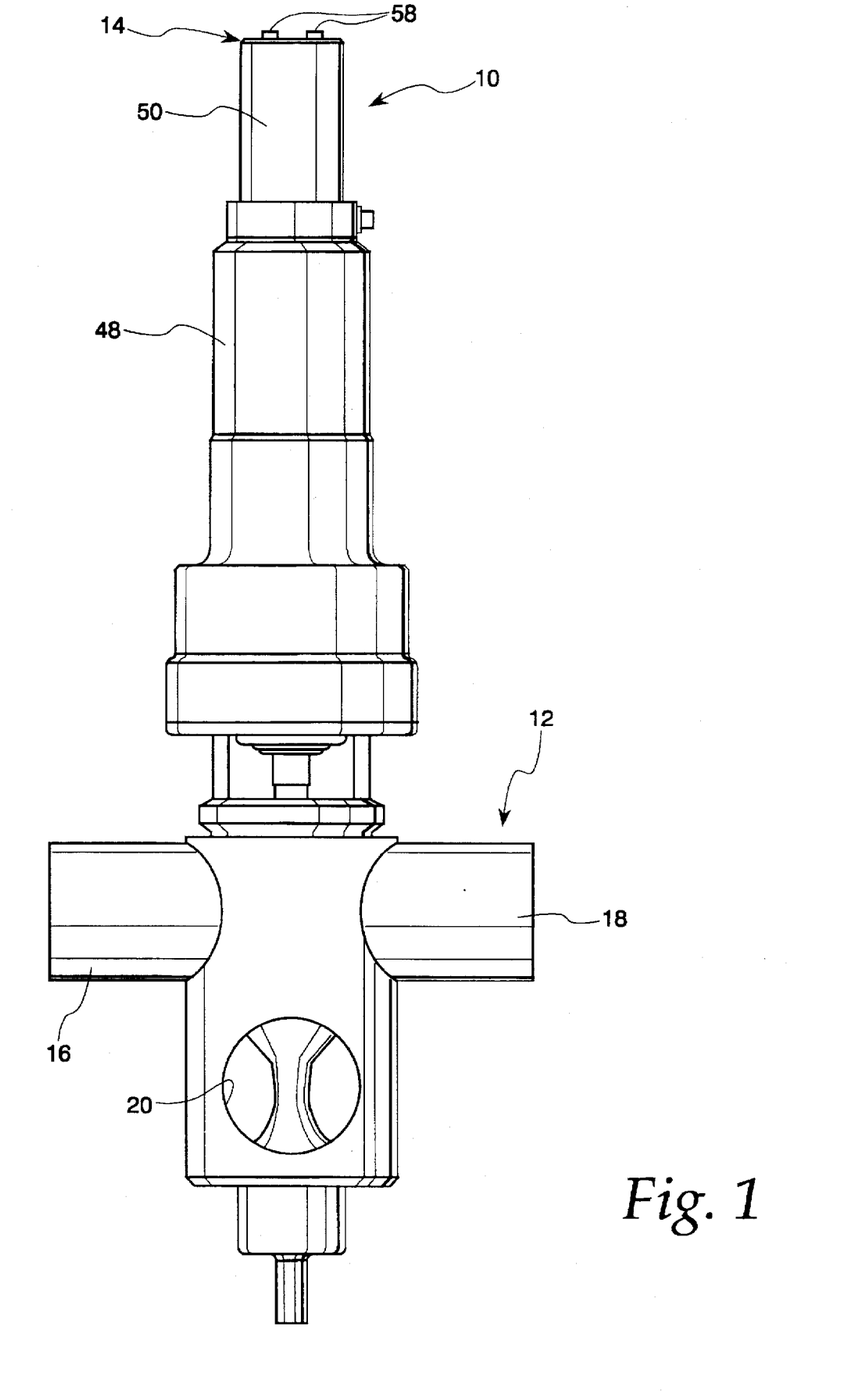
FIG. 1 is a front elevational view of a valve unit according to principles of the present invention.

The valve unit 10 includes a lower body 12 and an upper actuator assembly 14 which moves valve disks located within body 12. As mentioned, the valve unit accommodates separate product flow paths. A first product flow path extends through pipe-like coupling members 16, 18 extending through body 12 in a left to right direction, as shown in FIG. 1. A second product flow path extends through body 12 in a transverse direction through coupling members 20 (viewed on-end in FIG. 1). Body 12 defines a number of interior hollow cavities within which moving parts of the valve unit, and their cooperating valve seats and other components, are located.

As mentioned above, the valve unit 10 has four distinct operating positions. With brief reference to FIG. 6, these different operating positions are attained via pneumatic signals applied to valve unit 10 by solenoids. By turning the three solenoids on or off, the four operating states are achieved. As will be seen herein, actuator assembly 14 will be described in greater detail with FIGS. 8 and 10–12.

Figure 9:
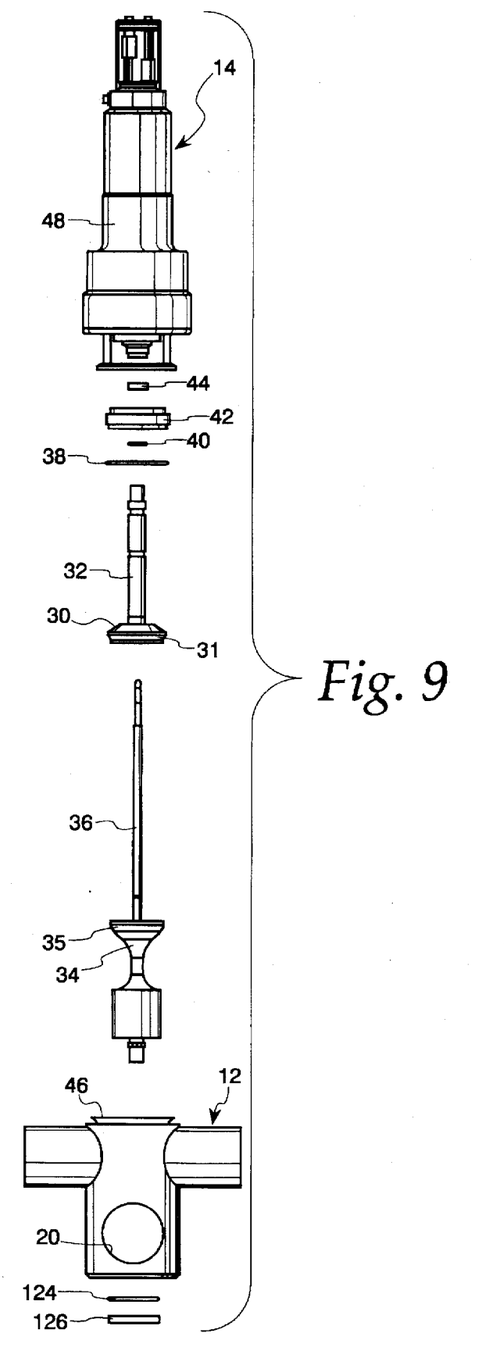
FIG. 9 is an exploded elevational view showing assembly of the lower portion of the valve unit.

Referring now to FIGS. 7–12, internal features of the valve unit 10 will now be described. FIG. 9 shows the valve body 12 prior to assembly of the internal components. Also show in FIG. 9 are an upper valve disk 30 carried on an upper stem 32 and a lower valve disk 34 carried on a lower stem 36. Valve disks 30, 34 include replaceable gaskets 31, 35, respectively. O-rings 38, 40 provide the sealing for the upper stem 32, while a bonnet 42 and bearing 44 are provided for mounting of the upper stem at the upper end 46 of valve body 12. The aforementioned pump-related parts are located within housing 12. The actuator assembly 14 is mounted at the upper end 46 of body 12 and moves the valve disks between their various operation positions.

Figure 10:
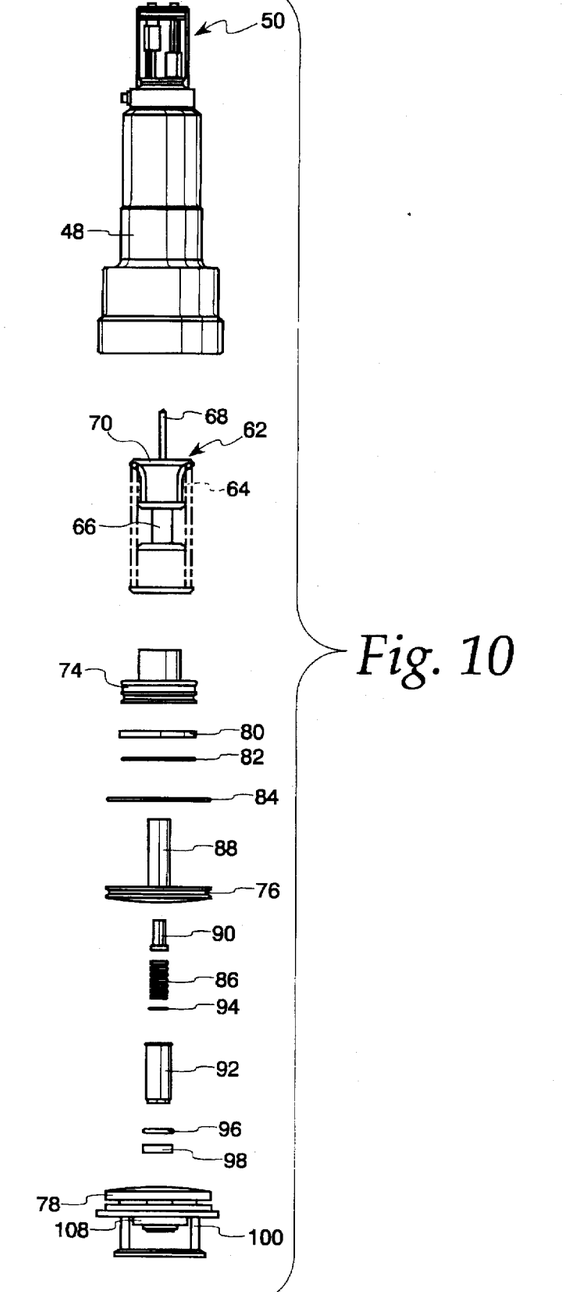
FIG. 10 is an exploded elevational view showing assembly of the upper portion of the valve unit.
Figure 11:
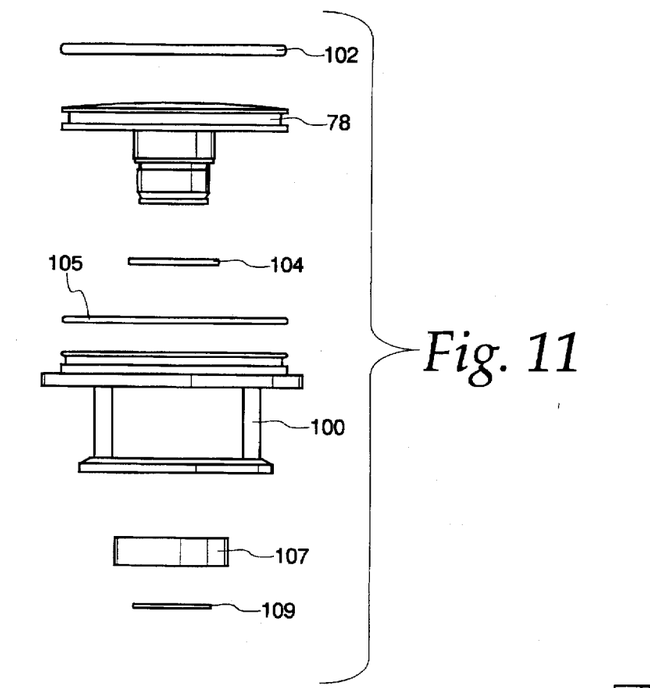
FIG. 11 is an exploded elevational view showing assembly of the upper valve member.
Figure 12:
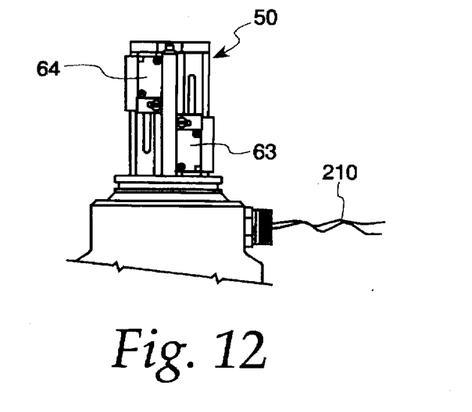
FIG. 12 is a fragmentary elevational view of the switch assembly portion thereof.

Turning now to FIGS. 10 and 11, the actuator assembly 14 will be described in greater detail. An actuator housing which carries a switch assembly generally indicated at 50 is shown at the upper end of FIG. 10. With additional reference to FIG. 8, the switch assembly 50 includes a cover 52, O-rings 53, 54, an upper cap 56 and mounting screws 58. A framework 60 is mounted atop actuator housing 48 and carries first and second proximity switches 63, 64, respectively.

Referring again to FIG. 10, a spring assembly generally indicated at 62 includes a large coil spring 64, an internal support 66, an indicator pin 68 carried on support 66, and an upper plate 70. FIG. 10 also shows a plurality of pistons 74, 76, and 78 arranged in serial succession, one on top of the other. Reference will be made herein to their relative positioning within the actuator assembly. The uppermost or upper piston 74, as will be seen herein, functions as a lower valve-lifting piston, lifting the lower valve disk 34 during a lower valve disk vent operation. As seen for example in FIG. 2b, the pistons 76, 78 have opposed convex faces so that their peripheral edges remain spaced apart. The middle piston 76 has a substantially larger size than piston 74. The lower piston 78 is substantially larger than upper piston 74 and functions as an upper valve lifting piston, lifting the upper valve disk during an upper valve disk venting operation. The middle piston 76 functions as a primary lifting or valve opening piston, moving both valve disks to the open position. Middle piston 76 also cooperates with the lower piston 78 to hold the upper valve disk in a closed position during venting of the lower valve disk.

A bearing 80 and O-rings 82, 84 are located between pistons 74, 76. A relatively small-size spring 86 is disposed within a hollow stem 88 of piston 76. Other resilient bias means could be used in place of the coil spring. A stop sleeve 90 and the sleeve 116 are also provided. The sleeve 116 is captured between the pistons 76, 78 in the completed assembly. O-rings 94, 96 and a bearing 98 complete the internal assembly of the piston assembly. Referring now to FIG. 11, the lower piston 78 is mounted in a yoke 100. O-rings 102, 104 and 105 are employed in the assembly, along with a ring nut 107 and lock ring 109.

Turning now to FIGS. 2–5, operation of the valve unit 10 will be described. FIGS. 2a–2c show the valve unit in a closed position. As shown in FIG. 2a, a first product flow extends in a generally horizontal direction, passing through coupling members 16, 18, while a second, isolated product flow is conducted through passageway 20 extending into and out of the plane of the paper. A connecting passageway 106 is formed between the two product flow paths. First and second valve seats 108, 110 are formed in passageway 106.

Figure 2A:
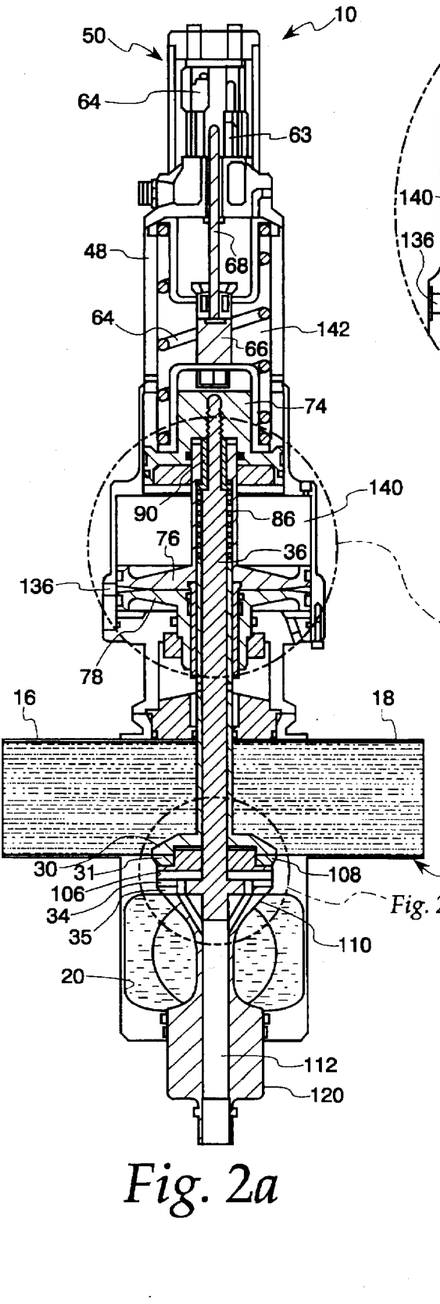
FIG. 2a is a cross-sectional view of the valve unit of FIG. 1, and FIGS. 2b and 2c show portions of FIG. 2a in greater detail.
Figure 2B:
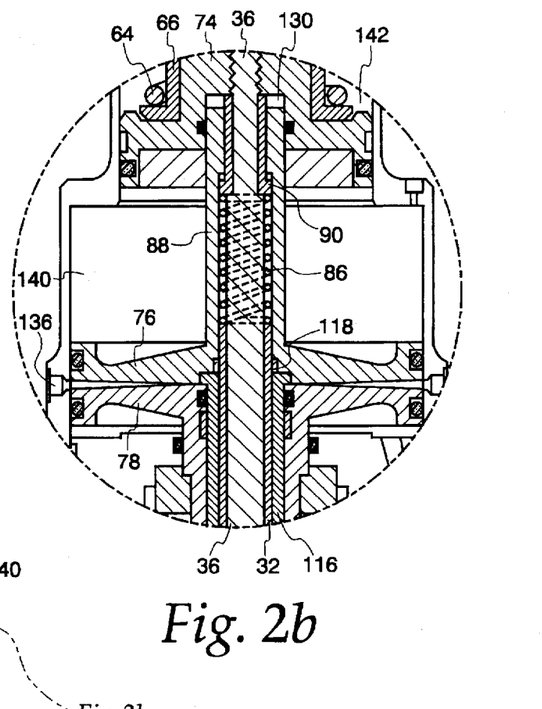
Figure 2C:
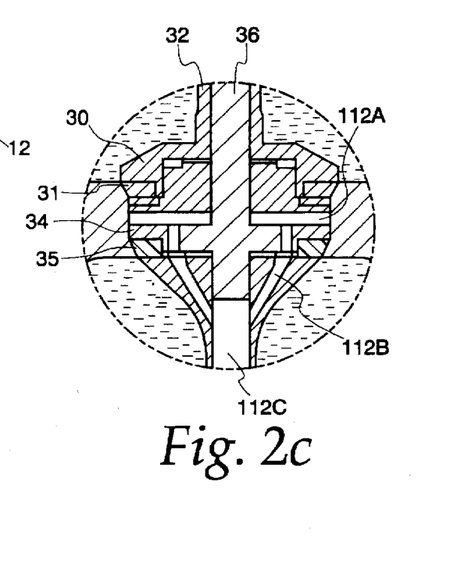

The upper and lower valve disks 30, 34 engage the valve seats 108, 110 to form a double block of any flow communication between the first and second product flow paths. In addition, a leakage path 112 is formed between the closed valve disks to divert any material which would leak past the valve disks away from the product flow paths. As shown in FIG. 2c, for example, leakage path 112 is coupled to the connecting passageway 106 and includes an entry position 112a, extending in a horizontal direction in the drawings, communicating with angled flow paths 112b and the central passageway 112c formed in the lower stem 36.

The stem 36 of the lower valve disk 30 passes through stop sleeve 90 and is threadingly engaged with the upper piston 74 which is received in the lower end of support 66. As can be seen in FIG. 2a, for example, the large spring 64 works against actuator housing 48 to apply downward pressure to small piston 74 and hence to lower valve disk 34, thus ensuring a sealing engagement with valve seat 110. As shown, for example, in the enlarged view of FIG. 2b, the smaller spring 86 applies a downward pressure against upper valve stem 36, holding the upper valve disk 30 in seating engagement with valve seat 108, and thus maintaining fluid within the upper product flow path. A sleeve 116 is secured to upper valve stem 32 by a locking ring 118 or other conventional fastening means. As will be seen herein, the sleeve 116 plays a role in other operating positions of the valve unit. In a closed operating position shown in FIGS. 2a–2c, it is not necessary to apply pneumatic signals to the valve unit, and spring pressure is relied upon to maintain the upper and lower valve disks in a closed position.

Figure 3A:
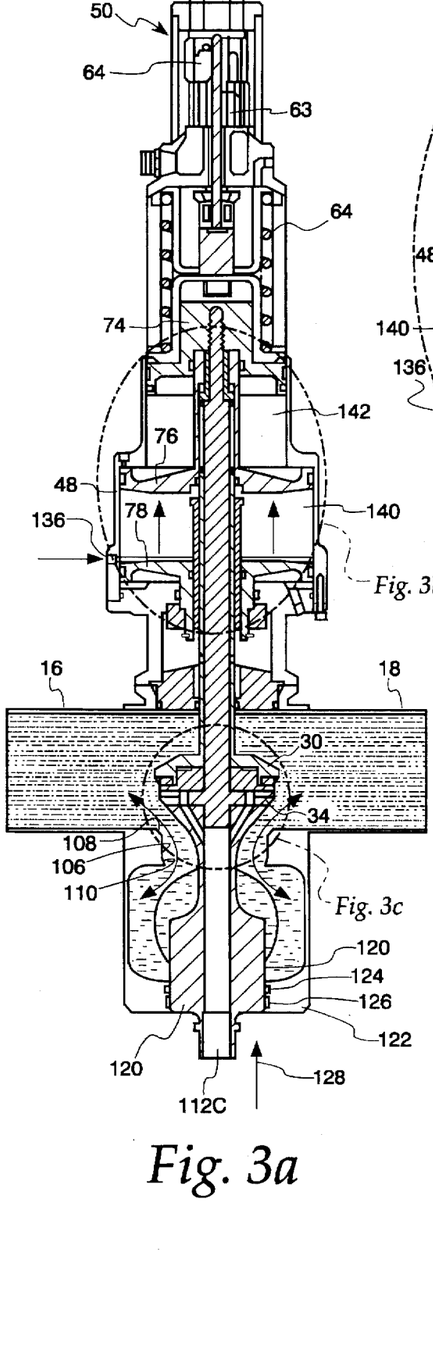
FIGS. 3a–3c show the valve unit in an open position.
Figure 3B:
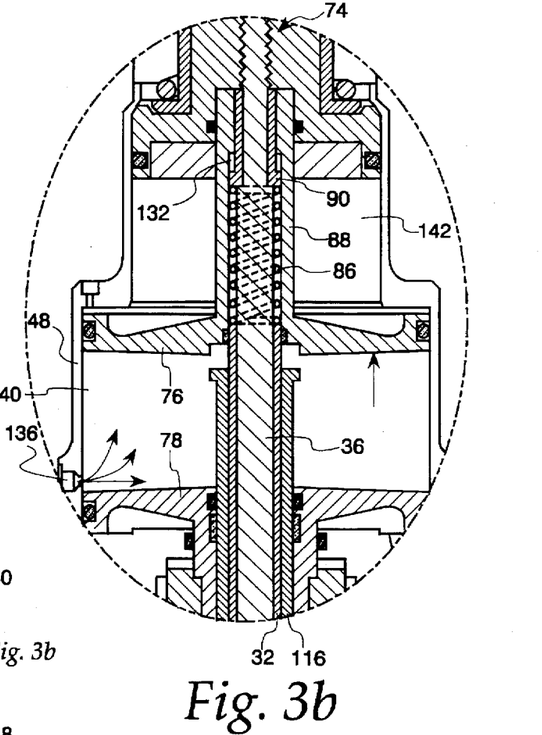
Figure 3C:
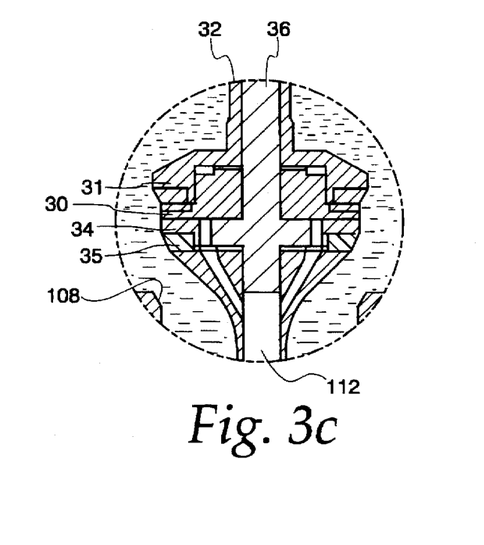

Referring now to FIGS. 3a–3c, valve unit 10 is shown in an open operating position with the first and second product flows mingling together through connecting passageway 106. As can be seen in FIG. 3a, valve stem 36 has an enlarged lower end 120 which is preferably generally cylindrical in configuration, passing through a cylindrical opening in the lower wall 122 of valve body 12. With additional reference to FIG. 9, an O-ring 124 and a bearing 126 are provided in housing wall 122 to seal and guide the lower end of valve stem 36 as it is moved upwardly in the direction of arrow 128. In general terms, lifting of the entire valve assembly, i.e., both upper and lower valve disks, is accomplished by lifting the middle piston 76. As shown, for example, in FIG. 3b, the upper end of stem 88 of middle piston 76 engages the upper piston 74. This movement can be seen, for example, by comparing FIGS. 2b and 3b. A gap 130 in FIG. 2b, appearing between the upper end of piston shaft 88 and the central recess formed in upper piston 74 is, as shown in FIG. 3b, eliminated by upper travel of middle piston 76. In FIG. 3b, the gap 132 between stop block 90 in the upper end of piston shaft 88 is enlarged, compared to that shown in FIG. 2b. Thus, as indicated, the middle piston 76 is raised within actuator housing 48. This raising of piston 76 also displaces the upper piston 74 in an upward direction, compressing the large spring 64, and raising the lower valve stem 36. As shown in FIG. 3c, the lower valve disk 34 is brought into contact with the upper valve disk 30 with continued lifting of lower valve stem 36, raising the upper valve stem 32, thereby compressing a small spring 86.

An inlet port 136 is provided in actuator housing 48, with a pressurized fluid signal entering immediately above the lower piston 78. In the preferred embodiment, the control signals applied to the valve are pneumatic. Hydraulic signals could also be used. Referring to FIG. 2a, for example, the pistons 76, 78 are pressed together. As can be seen in FIGS. 2a and 2b, for example, the valve disks 76, 78 have a generally convex configuration, so that an outer space is formed between the valve disks, even when the valve disks are in contact with one another, as shown for example in FIG. 2b. As can be seen, the inlet port 136 communicates with this space between the closed valve disks. With the application of air pressure, the middle piston 76 is raised within the actuator housing 48, as indicated by the arrows in FIG. 3a. As shown, actuator housing 48 has two air chambers 140, 142 for the pistons 76, 74, respectively. As indicated in FIG. 3a, both pistons 74, 76 travel throughout their respective air chambers 142, 140, although air pressure is developed only in the lower air chamber 140 and is sufficient to raise both pistons. It is preferred that the upper air chamber 142 is vented during the opening operation to reduce back pressure experience by piston 76. As can be seen in FIGS. 3a and 3c, the valve disks are operated to close the leakage path 112 to prevent entry of product flow.

Figures 4A, 4B, 4C:
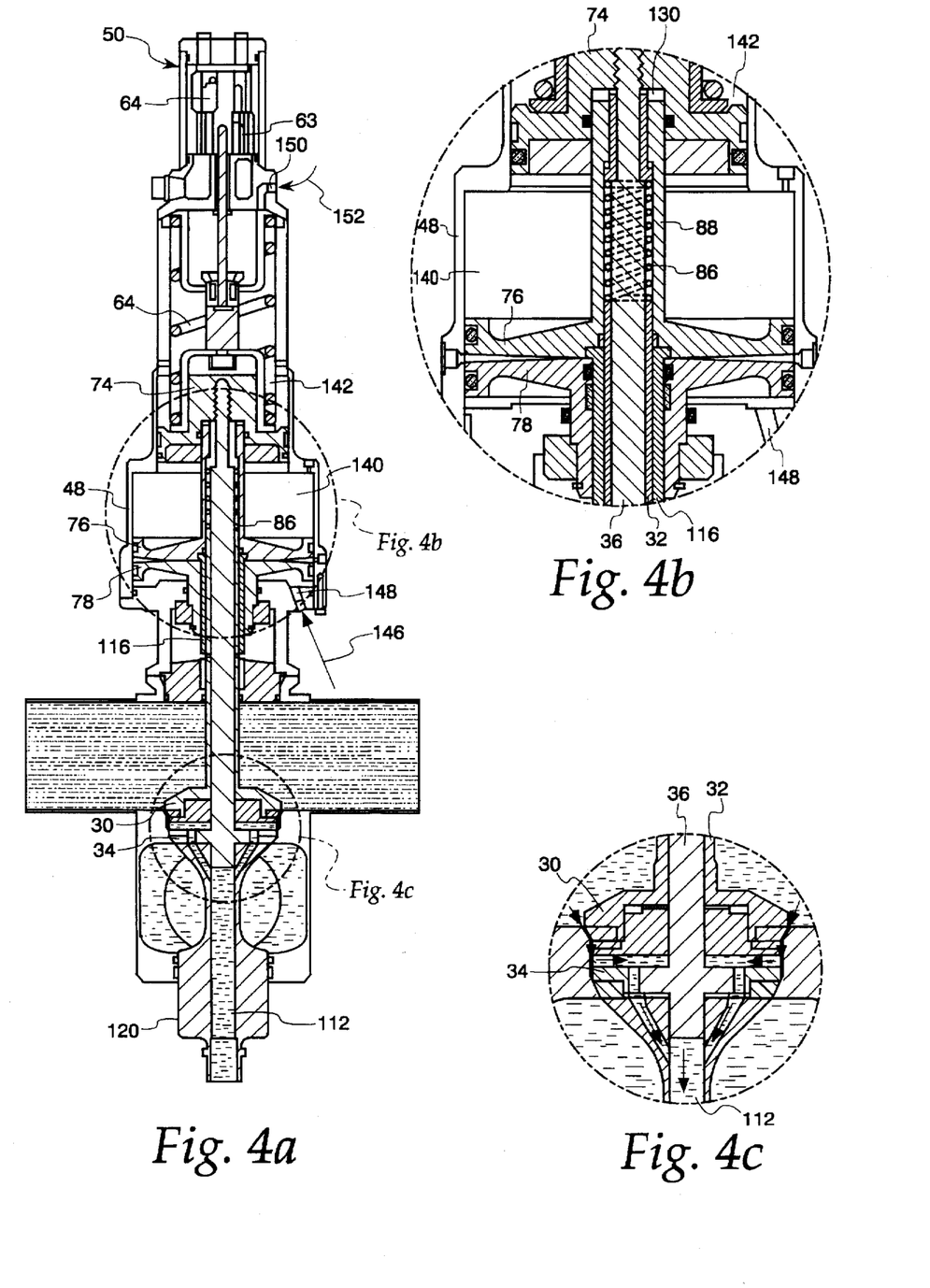
FIGS. 4a–4c show the valve unit in an upper valve vent position.

Referring now to FIGS. 4a–4c, the upper valve disk 30 is "cracked" open a small amount so as to allow fluid in the first product path to vent through vent channel 112. During this operation, the lower valve disk 34 is held in a closed position. As indicated by arrow 146 in FIG. 4a, air pressure is introduced through a passageway 148 into the lower end of pressure chamber 140, beneath lower piston 78. This raises the lower piston 78 slightly, causing it to contact middle piston 76 and optionally to remove any slack permitted the middle piston 76.

As can be seen, for example, in FIG. 4b, the gap 130 between the upper piston 74 and the upper end of piston shaft 88 is maintained, first indicating that upward pressure is preferably not applied against the upper piston 74. Accordingly, the large spring 64 continues to maintain the lower valve disk 34 in a closed position. Raising of the lower piston 78 causes the piston to abut the enlarged upper end of sleeve 116, thus lifting the upper valve stem 32 a slight amount. As indicated in FIG. 4c, this allows fluid from the upper product flow path to enter the bleed passageway 112. If desired, air can be introduced into passageway 150 as indicated by arrow 152 so as to apply a downward pressure on the upper piston 74, thereby assisting large spring 64 in maintaining the lower valve disk 34 in a closed position. The pneumatic assist has, however, been found unnecessary.

Figure 5A:
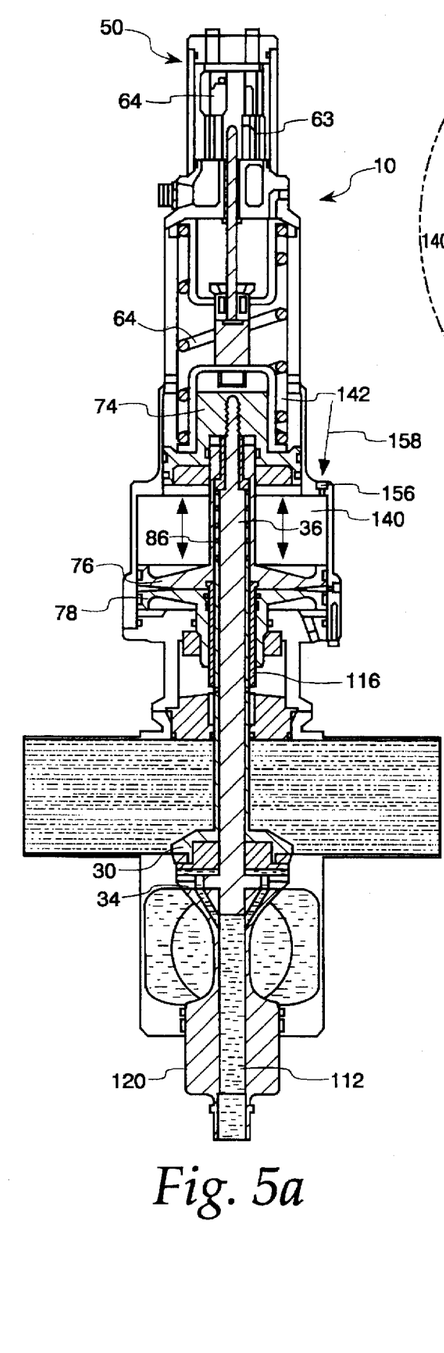
FIGS. 5a–5c shown the valve unit in a lower valve vent position.
Figure 5B:
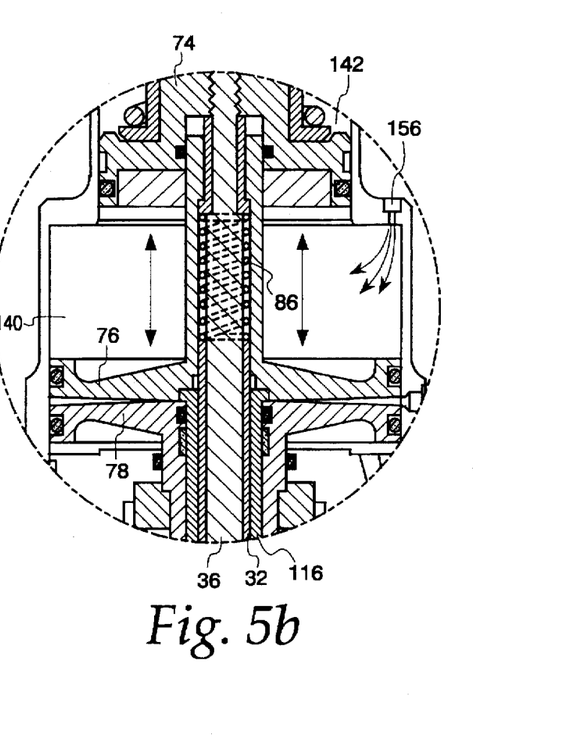
Figure 5C:
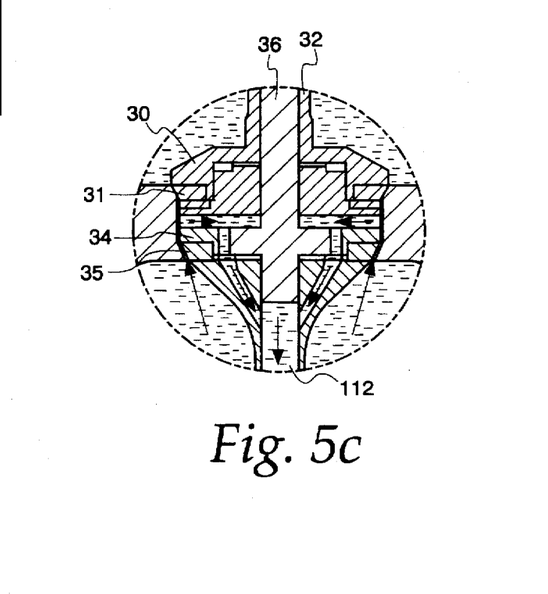

Referring now to FIGS. 5a–5c, a lower valve disk venting operation is achieved by introducing pressurized air at input port 156, as indicated by arrow 158. This causes pressurized air to enter chamber 140, simultaneously pressing the upper piston 74 in an upper direction, while pressing the middle piston 76 and sleeve 116 in a downward direction. The upper pressure on upper piston 74 lifts the lower valve stem 36, thereby raising the lower valve disk 34, a slight amount so as to allow fluid in the lower product flow path to enter the bleed channel 112. During this time the lower piston 78 is floating. Thus, while the lower valve disk is being lifted for a venting operation, an air boost is applied to the upper valve disk to maintain the upper valve disk in a closed position, thereby ensuring isolation of the product flow paths when the space between the valve seats is flush. The concurrent application of a common pressure signal to the upper and lower valve disks overcomes problems associated with accidental restrictions in the bleed path which can lead to an unwanted lifting of the upper valve disk. Depending upon the relative pressures in the product flow paths, restrictions in the bleed path can result in lifting forces applied to the upper valve disk which might overcome the small spring 86. Thus, an extra measure of performance is assured during a venting operation, especially venting operations of the lower valve disk.

Referring again to FIG. 7, indicator pin 68 is located atop the lower valve stem 36 and its related assembly. Indicator pin is also shown in the schematic diagram of FIG. 68. As the valve is operated in its various positions, indicator pin 68 rises within the switch assembly located at the top of the valve unit. Switch 62 is located below switch 64 and first detects the presence of indicator pin 68 as valve stem 36 is raised. Electrical conductors 120 shown in FIG. 6 are coupled to the switches 63, 64 and send signals to a control unit (not shown) to provide, for example, indication through an annunciator panel or the like confirming the valve's operations.

Figure 7:
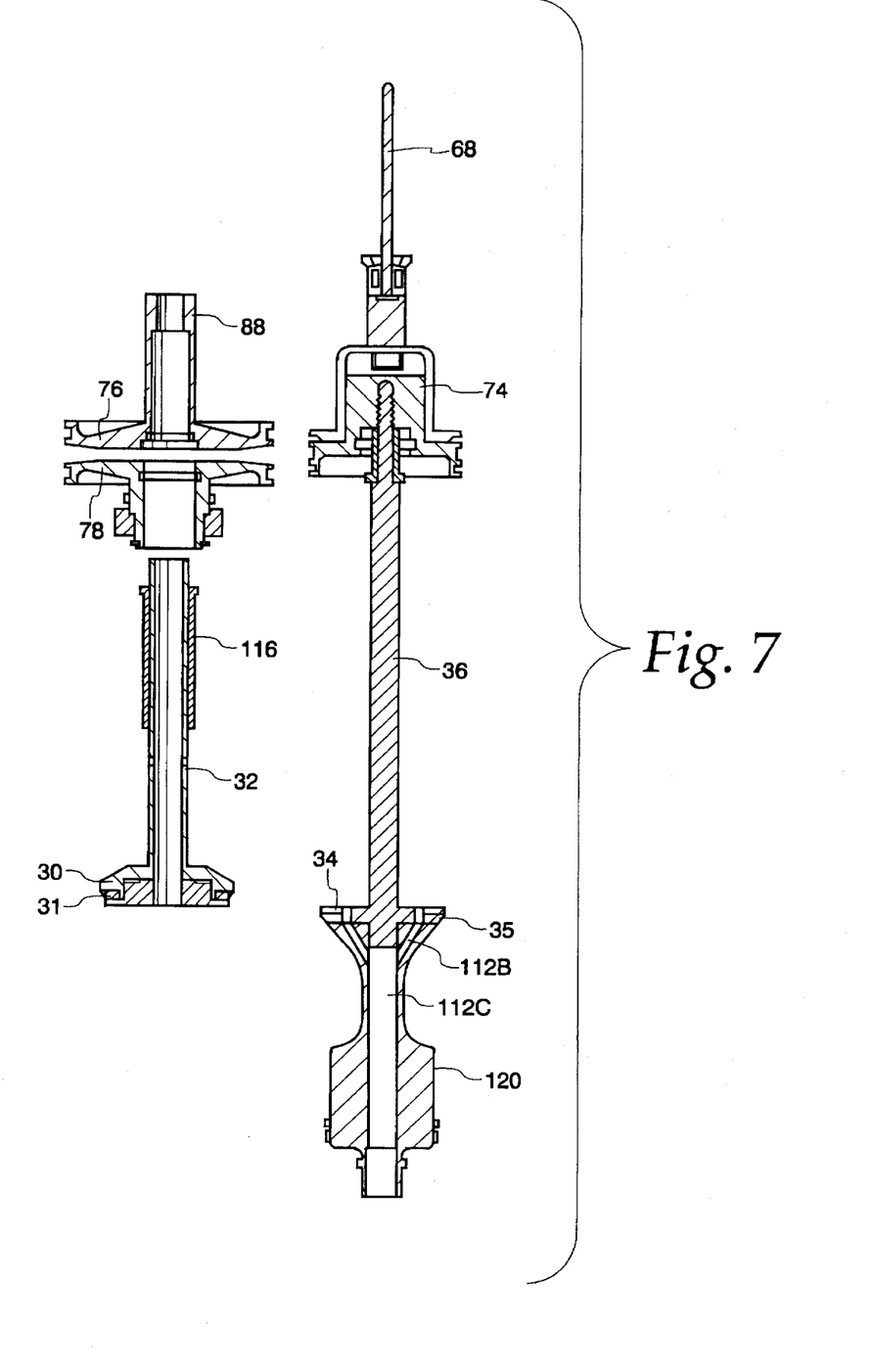
FIG. 7 shows several components of assemblies of the valve unit.
Figure 8:
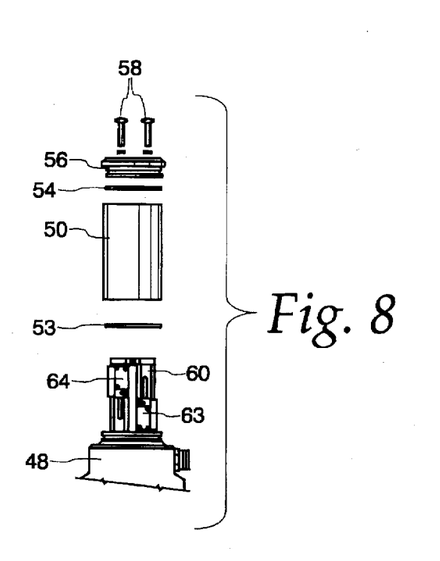
FIG. 8 is a fragmentary elevational view showing the upper switch assembly portion of the valve unit.

It should be noted that in FIG. 7 the sleeve 116 is shown in its installed position when threaded onto stem 32. However, the upper enlarged end of sleeve 116, when installed in the valve unit, is captured between pistons 76, 78.

Figure 6:
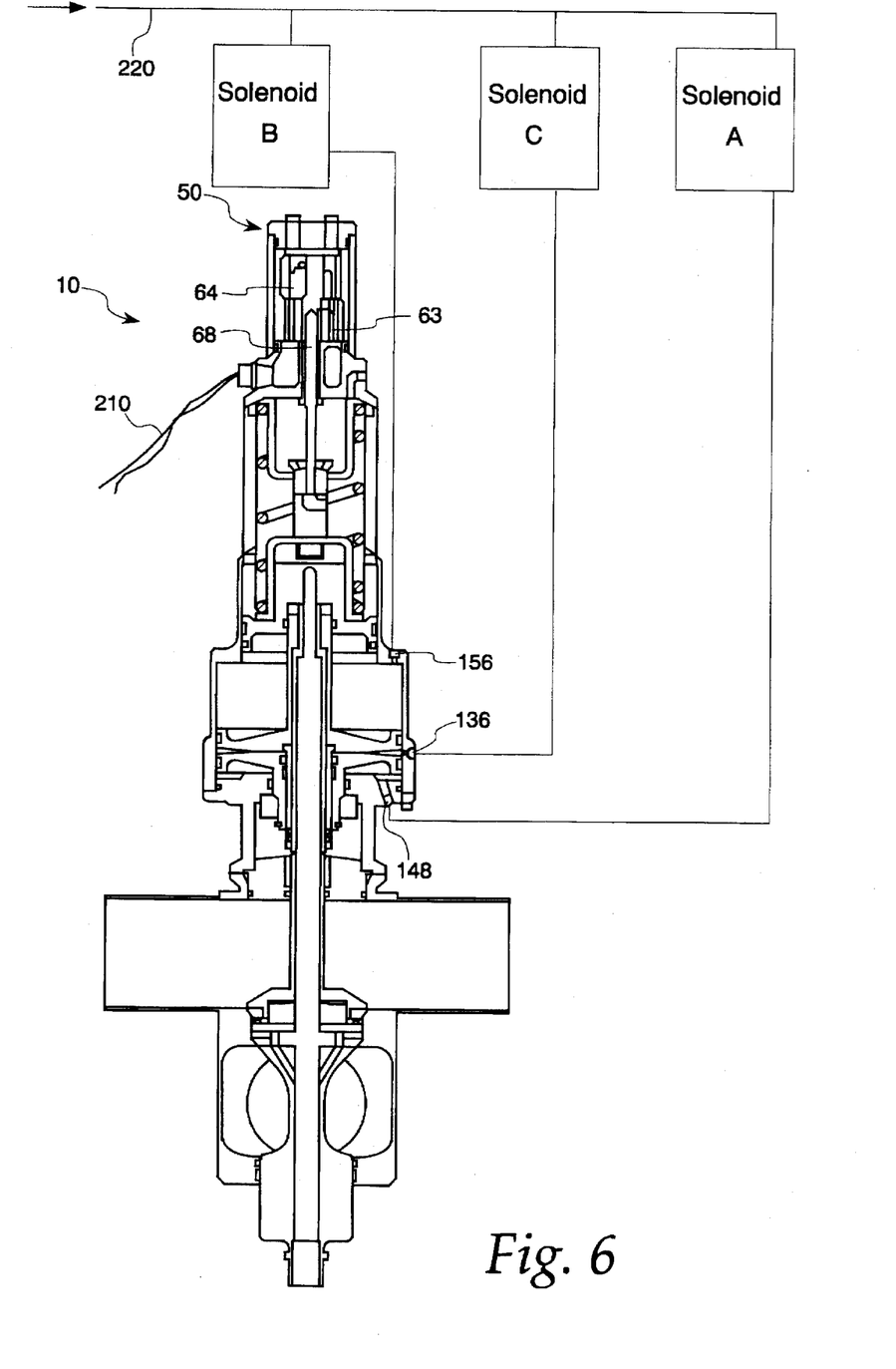
FIG. 6 shows a schematic diagram of pneumatic operation of the valve unit.

In the preferred embodiment, the control unit also controls operation of solenoids A,B and C shown in FIG. 6. The solenoids operate control valves which send pressurized control signals to the input ports 136, 148 and 156. Operation of solenoid A, for example, sends a pressure signal to input port 148 which, as described with reference to FIGS. 4a–4c raises the upper valve disk for a venting operation. If desired, a fourth solenoid could be added to the control signal bus 220 shown in FIG. 6. The fourth solenoid would provide an optional pressure signal to input port 150, as described above with reference to FIG. 4a so as to hold the lower valve disk in a closed position, supplementing the closing force of large spring 64.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A valve unit, comprising:

a body including first and second valve seats and defining first and second product flow paths, a leakage flow path, and a connecting passageway between said first and said second product flow paths;

first and second valve disks movable between respective open and closed positions, said first and said second valve disks cooperating with said first and said second valve seats to permit and to block flows between said first and said second product flow paths and said connecting passageway, respectively;

actuator means including pressure chamber means with at least a first, a second and a third pressure chamber for containing a pressurized fluid, and for containing first, second and third pistons and first, second and third inlet ports for receiving respective pressure signals associated with the first, second and third pressure chambers, respectively, a first pressure chamber located between the second and the third pistons, the second pressure chamber located between the first and the second pistons and the third piston located between the first and the third pressure chambers, the first piston coupled to the second valve disk to open the second valve disk, the second piston responsive to an opening signal in the first pressure chamber to engage the first piston so as to open the second valve disk, and the first piston responsive to a second bleed signal in the second pressure chamber to at least partly open the second valve disk while concurrently applying the second bleed signal in the second pressure chamber to the second piston to apply a closing force to the first valve disk so that the first valve disk remains closed and the third piston responsive to a first bleed signal in the third pressure chamber to at least partly open the first valve disk while permitting the second valve disk to remain closed.

2. The valve unit of claim 1 wherein said first and said second pistons have opposed convex operating faces and said first pressure chamber inlet port directs a flow of pressurized fluid between said first and said second pistons.

3. The valve unit of claim 1 wherein said second pressure chamber inlet port directs the second bleed signal between the first and the second pistons, with the second piston holding down the first valve disk and the first piston raising the second valve disk to permit a venting flow past the second valve disk.

4. The valve unit of claim 1 wherein said first and said second valve disks are independently movable to respective venting positions to permit respective venting flows past said first and said second valve disks into said leakage flow path.

5. The valve unit of claim 1 wherein said first and said second valve disks cooperate, when in their respective closed positions, to define an internal flow path extending to said leakage flow path so as to divert leakage flow past the valve disks from entering said first and said second product flow paths.

6. The valve unit of claim 5 wherein said first and said second valve disks cooperate, when in their respective open positions, to close said internal flow path so as to prevent flow from said first and said second product flow paths from entering said leakage flow path.

7. The valve unit of claim 1 wherein said first, said second and said third pistons are of at least two different sizes.

8. The valve unit of claim 1 wherein said actuator means includes at least two resilient bias means of different sizes, a smaller one holding the first valve disk in the closed position and a larger one holding the second valve disk in the closed position.

* * * * *